United States Patent [19]
Wilbur et al.

[11] 3,914,428
[45] Oct. 21, 1975

[54] METHOD OF USING 2-ARYLIMINO-1,3-DITHIETANE COMPOUNDS AS GROWTH PROMOTANTS

[75] Inventors: Robert Daniel Wilbur, Titusville; Joseph Michael Pensack, Trenton, both of N.J.

[73] Assignee: American Cyanamid Company, Stamford, Conn.

[22] Filed: Sept. 23, 1974

[21] Appl. No.: 508,134

Related U.S. Application Data

[63] Continuation-in-part of Ser. No. 409,838, Oct. 26, 1973, abandoned.

[52] U.S. Cl. ............................ 424/277; 260/327 M
[51] Int. Cl.² .................................... A61K 31/385
[58] Field of Search ...................................... 424/277

[56] References Cited
UNITED STATES PATENTS
3,484,455   12/1969   Addor .......................... 260/327 M

*Primary Examiner*—V. D. Turner
*Attorney, Agent, or Firm*—Ernest Y. Miller

[57] ABSTRACT

A method for improving feed efficiency and accelerating the growth rate of animals by administering to said animals a growth-promoting amount of a 2-arylimino-1,3-dithietane compound, is described.

11 Claims, No Drawings

METHOD OF USING 2-ARYLIMINO-1,3-DITHIETANE COMPOUNDS AS GROWTH PROMOTANTS

This application is a continuation-in-part of our application Ser. No. 409,838, filed Oct. 26, 1973, now abandoned.

PRIOR ART

In the past, a number of animal growth-promoting agents such as the tetracycline-type antibiotics, penicillin and zinc bacitracin, and hormonal agents such as diethylstilbestrol, have been used successfully to improve feed efficiency and increase the growth rate of poultry and farm animals. However, with the increasing demand demand for greater food production, skyrocketing animal feed costs and a withdrawal of certain growth-promoting agents from the market place, it is now imperative that new methods and compositions be provided which will enhance the growth rate of animals and improve feed conversion (i.e., the ratio of unit weight of feed per unit weight of gain) in the raising of said animals.

SUMMARY OF THE INVENTION

We have now found a method for improving feed efficiency and enhancing the growth rate of poultry and animals hereinafter described by orally or parenterally administering to said poultry and animals a growth-promoting amount of a compound having the formula:

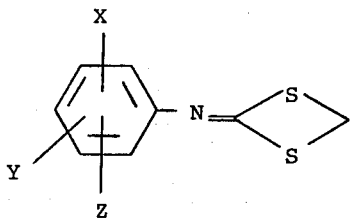

wherein X is a member selected from the group consisting of hydrogen, $C_1$–$C_4$ alkyl, $C_1$–$C_4$ alkoxy, thiocyano, nitro, pyrrolidinylsulfonyl dithietane, $C_1$–$C_4$ alkylthio, and $C_1$–$C_4$ alkylsulfonyl; Y is a member selected from the group consisting of hydrogen, halogen, $C_1$–$C_4$ alkyl, $C_1$–$C_4$ alkoxy, and —$CO_2R$ where R is a $C_1$–$C_4$ alkyl; Z is a member selected from the group consisting of hydrogen, chloro and $C_1$–$C_4$ alkyl; with the proviso that when Z is hydrogen, X and Y may be taken together to form a methylenedioxy group attached to adjacent carbon atoms of the phenyl radical.

The term "halogen" is intended to include chlorine, bromine, iodine or fluorine; and the terms "alkyl" and "alkoxy" are intended to include straight or branched chain alkyl and alkoxy groups of the chain length indicated.

The 2-arylimino-1,3-dithietanes of the present invention which exhibit this unique property of improving feed efficiency and promoting poultry and animal growth have the formula:

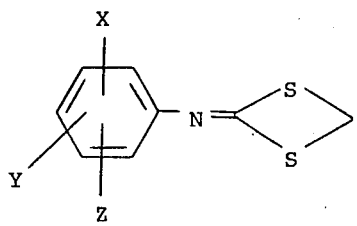

wherein X, Y and Z are as described above and can be prepared by reacting the appropriate aniline with carbon disulfide and base to yield the desired dithiocarbamate salt which is then reacted with a methylene halide in the presence of base to give the desired 2-arylimino-1,3-dithietane. Graphically, these reactions may be illustrated as follows:

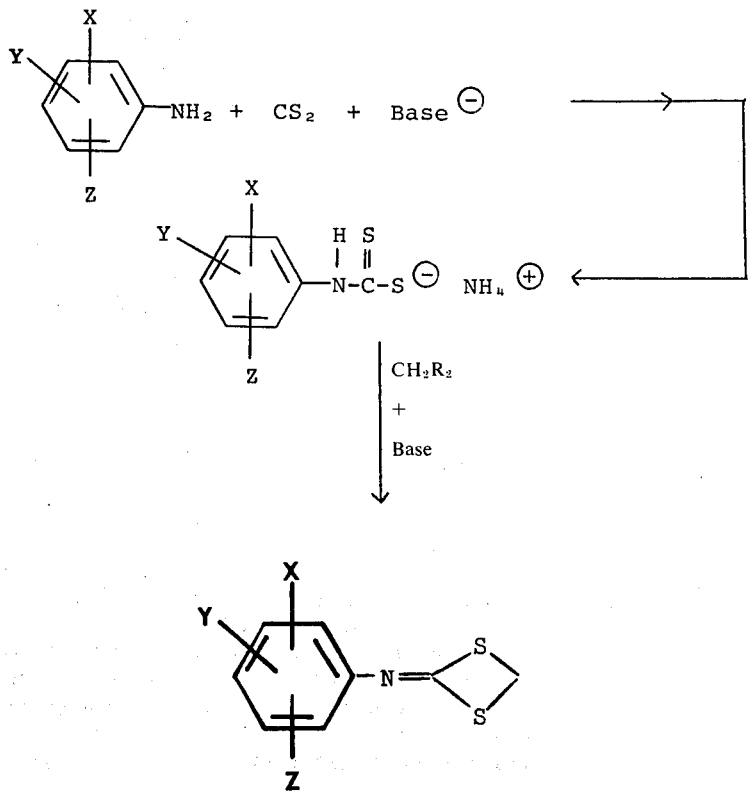

where X, Y and Z are as described above, R is bromine, chlorine or iodine. In those reactions, the base is preferably ammonium hydroxide or sodium hydroxide, and the methylene halide may be methylene iodine, methylene bromide or methylene chloride. The above reactions are described in U.S. Pat. No. 3,484,455.

To the best of our knowledge, the compounds of this invention have not, heretofore, been suggested for either oral or parenteral administration to poultry and animals. However, certain of said compounds such as the 2-phenyl, 2-monoloweralkyl-substituted phenyl and 2-monohalo-substitued phenylimino-1,3-dithietanes are described in U.S. Pat. No. 3,484,455, issued Dec. 16, 1969, where they are characterized as pesticides with a borad spectrum of activity against insects, plant nematodes, arachnids, fungi and bacteria.

Surprisingly, we have discovered that feed efficiency in the raising of poultry such as chickens and turkeys, furbearing animals (i.e., animals raised for their pelts such as mink, rabbit and sable), and farm animals (i.e., livestock such as sheep, cattle, swine and goats), can be improved by orally or parenterally administering to the host an effective amount of a 2-arylimino-1,3-dithietane, and preferably an orthosubstituted 2-arylimino-1,3-dithietane. We have also found that administration of said dithietane measurably enhances the growth rate of said poultry and animals. Moreover, we have found that orthosubstitution of the 2-arylimino-1,3-dithietanes generally improves the activity of the compound. Where di- or tri-substituted 2-arylimino-1,3-dithietanes are used, it is also preferable to provide a selected substituent in the ortho-position on the ring.

In accordance with this invention, the growth rate of poultry and animals is measurably improved when a 2-arylimino-1,3-dithietane is administered to the abovesaid host, in or with the feed in an amount equivalent to between 0.0001% and 0.05%, and preferably 0.001% to 0.02% by weight of the feed.

In practice, the active material will generally be formulated as a premix and/or an animal feed supplement which is admixed with a nutritionally balanced feed or added to said feed as a top dressing, or the like.

Premixes may be prepared by blending about 80% to 99% by weight of rice flower, ground rice hulls, ground corn, or the like, with about 1% to 20% by weight of the 2-arylimino-1,3-dithietane. From about 0.2% to 2%, and preferably about 0.5% to 1.0% by weight of the premix, is then blended with other edible substances including vitamins, minerals and feedstuffs to form a feed supplement or complete diet.

A typical cattle supplement is described below.

| Beef Cattle Supplement | Feed Rate | |
|---|---|---|
| | 2 lbs/Head/Day | 1 lb/Head/Day |
| Dehydrated Alfalfa Meal (17%) | 13.0% | 26.5% |
| Cotton Seed Meal (41%) | 13.5% | 27.0% |
| Limestone (33%) | 11.0% | 22.0% |
| Urea (2.81%) | 6.0% | 12.0% |
| Dried Molasses | 2.5% | 5.0% |
| Salt, Iodized | 2.5% | 5.0% |
| Vitamin-Mineral Premix[1] | 1.0% | 2.0% |
| Drug Premix[2] | 0.5% | 0.5% |
| Ground Corn | 50.0% | — |

[1]Vitamin-Mineral Premix (per 1000 lbs. of supplement)

| | 2 lbs/Head/Day | 1 lb/Head/Day |
|---|---|---|
| Vitamin A (30,000 I.U./g) | 833 g. | 1666 g. |
| Cobalt Sulfate ($CoSO_4.7H_2O$) | 2 g. | 4 g. |
| Copper Sulfate ($CuSO_4.5H_2O$) | 78 g. | 156 g. |
| Manganese Oxide (MnO) | 32 g. | 64 g. |
| Zinc Oxide (ZnO) | 62 g. | 124 g. |
| Elemental Sulfur | 2000 g. | 4000 g. |
| Dehydrated Alfalfa Meal | 1533 g. | 3066 g. |
| | 4540 g. | 9080 g. |

[2]Drug Premix (per 1000 lbs. of supplement)

| 2-Arylimino-1,3-dithietane Level of Drug per Head/Day (mg) | 2 lbs/Head/Day Amount in Premix | | 1 lb/Head/Day Amount in Premix | |
|---|---|---|---|---|
| | Drug (g) | Ground Corn (g) | Drug (g) | Ground Corn (g) |
| 400 | 200 | 2070 | 400 | 1870 |
| 200 | 100 | 2170 | 200 | 2070 |
| 100 | 50 | 2220 | 100 | 2170 |
| 50 | 25 | 2245 | 50 | 2220 |
| 0 | 0 | 2270 | 0 | 2270 |

The growth rate of animals is also improved when the dithietane is administered as a subcutaneous implant under the skin of the animal. Implants are generally in the form of a paste or pellet which permits the active compound to be released into the bloodstream of each animal over an extended period of time; as for example, from several weeks to several months.

Whether the implant is in the form of a paste or a pellet is simply a matter of choice. The important factor is the amount of drug to be administered. We have found that formulations and intervals between administration should be varied to give about 0.001 mg. to 0.2 mg. of the dithietane per kg. of animal body weight per day, and preferably from 0.01 mg. to 0.10 mg. per kg. of animal body weight per day will enhance the growth rate of animals and improve feed efficiency.

Pellet-type implants which can be used in accordance with this invention may be prepared by admixing from about 50% to 95% by weight of the 2-arylimino-1,3-dithietane with from about 50% to 5% by weight of a pharmaceutically acceptable carrier such as Castor wax (i.e., glyceryl 12-hydroxy stearate), white wax, beeswax, starch, or a high molecular weight (4000) polyethylene glycol, or mixtures thereof, alone or in combination with a small amount of a lubricant such as zinc or magnesium stearate. A small amount of polyvinylpyrrolidone and dibutylphthalate may also be incorporated in the above-said formulations.

Typical formulations which can be used are as follows:

|   |   | Preferred |
|---|---|---|
| (A) | 2-Arylimino-1,3-dithietane (50% to 95%) | 50.0% |
|   | Lubricant (i.e. magnesium stearate) | 0.5% |
|   | Castor wax - QS |   |
| (B) | 2-Arylimino-1,3-dithietane | 60.0% |
|   | Polyethylene glycol 4000 | 10.0% |
|   | Beeswax - QS |   |
| (C) | 2-Arylimino-1,3-dithietane | 30.0 mg |
|   | Beeswax | 1.0 mg |
|   | Magnesium stearate | 1.5 mg |
|   | Dibutylphthalate | 1.0 mg |
|   | Polyvinylpyrrolidone (10% Solution) - QS |   |

Paste implants can be prepared using the same percentages of drug as stated above but employing a mixture of high molecular weight (4000) and low molecular weight (400) polyethylene glycol alone or in combination with castor wax or beeswax and/or polyvinylpyrrolidone. A typical paste can be prepared as follows:

|   |   | Preferred |
|---|---|---|
| (A) | 2-Arylimino-1,3-dithietane (100 mg to 600 mg) | 200 mg |
|   | Polyethylene glycol 4000 (30% to 50%) | 40% |
|   | Polyethylene glycol 400 - QS |   |

Implants may vary in size and weight, but usually range between 5 mg. and 100 mg. per implant with multiple implants being used to supply the necessary drug to larger animals.

The present invention is further illustrated by the examples set forth below.

EXAMPLE 1

Mouse growth Regulant Evaluation

Six-week-old female Carworth CF-1 mice, averaging 18 to 21 grams in weight, are placed ten to a cage and fed Purina Laboratory Chow ad libitum for 13 days. At the end of this feeding period, the mice are weighed and fed diets containing the experimental compounds for a 12-day period. At the end of the test feeding period, the mice are weighed and the gain for the period recorded. This gain is then compared to the gain of control animals. Experimental compounds are fed at 200 ppm in the diet. The diet used is reported below and data obtained are reported in Table I, where growth enhancement is reported as percent increase over controls. Control animals received the same diet as test animals but without test compound added.

In each instance, animals receiving test compound were noticeably larger than control animals and had betterlooking pelts than the control animals.

DIET

| Crude protein not less than | 23.0% |
|---|---|
| Crude fat not less than | 4.5% |
| Crude fiber not more than | 6.0% |
| Ash not more than | 9.0% |

INGREDIENTS

Meat and bone meal, dried skimmed milk, wheat germ meal, fish meal, animal liver meal, dried beet pulp, ground extruded corn, ground oat groats, soybean meal, dehydrated alfalfa meal, cane molasses, animal fat preserved with BHA, vitamin $B_{12}$ supplement, calcium pantothenate, choline chloride, folic acid, riboflavin supplement, brewers' dried yeast, thiamin, niacin, vitamin A supplement, D activated plant sterol, vitamin E supplement, calcium carbonate, dicalcium phosphate, iodized salt, ferric ammonium citrate, iron oxide, manganous oxide, cobalt carbonate, copper oxide, zinc oxide.

TABLE I

Growth Enhancement of Mice
Reported as Percent Increase in Weight Gain
Over Untreated Controls

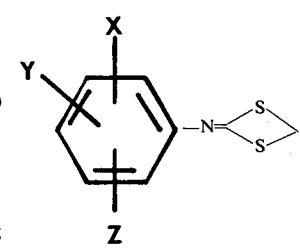

| X | Y | Z | % Increase Over Controls |
|---|---|---|---|
| 4-Cl | 2-CH₃ | H | 31.0 |
| 2-CH₃ | H | H | 25.9 |
| 3-CH₃ | H | H | 29.3 |
| 3-NO₂ | H | H | 19.9 |
| 2-C₂H₅ | 6-C₂H₅ | H | 26.1 |
| 2-Cl | 3-Cl | H | 5.1 |
| 3-OC₂H₅ | H | H | 4.5 |
| 2-CH₃ | 4-CH₃ | 5-CH₃ | 45.2 |
| 2-CH₃ | 4-Br | H | 9.4 |
| 2-Cl | 5-Cl | H | 18.3 |
| 4-SCN | H | H | 20.0 |
| 4—N⟨S/S⟩ | H | H | 25.4 |
| 2-Br | 4-CH₃ | H | 44.7 |
| 4-OH | 3-Cl | 5-Cl | 27.0 |

TABLE I — Continued

| R | R' | R'' | value |
|---|---|---|---|
| 2-CH$_3$ | 3-Cl | H | 51.1 |
| 4-SO$_2$-N(pyrrolidinyl) | | H | H | 46.6 |
| 4-S-C$_6$H$_4$-NO$_2$ | | H | H | 14.4 |
| 4-O-C$_6$H$_4$-Cl | | H | H | 0.6 |
| 2-Br | 4-CO$_2$CH$_3$ | H | 45.0 |
| 4-NO$_2$ | 2-OCH$_3$ | H | 18.2 |
| 2-OCH$_3$ | H | H | 0.6 |
| 2-OCH$_3$ | 4-OCH$_3$ | H | 1.1 |
| 2-Cl | 4-CH$_3$ | H | 35.8 |
| 3-N=C(S-CH$_2$-S) | | H | H | 14.6 |
| 2-Cl | 6-CH$_3$ | H | 0.7 |
| 2-CH(CH$_3$)$_2$ | 6-CH(CH$_3$)$_2$ | H | 13.2 |
| 2-SCH$_3$ | H | H | 39.4 |
| 2-Br | H | H | 23.3 |
| 2-OC$_2$H$_5$ | H | H | 27.1 |
| 2-CH$_3$ | 6-CH$_3$ | H | 24.4 |
| 2-SO-CH$_3$ | H | H | 17.6 |
| 2-F | H | H | 6.5 |
| —O—CH$_2$—O— | | H | 8.2 |

EXAMPLE 2

Growth Enhancement and Feed Efficiency Evaluations in Sheep

To determine the effect of feeding a 2-arylimino-1,3-dithietane compound to sheep, wether lambs are randomly allotted to pens in groups of six. The sheep are weighed and permitted food and water ad libitum. The feed is weighed daily, and uneaten feed from the previous day collected and weighed. Lambs receiving unmedicated diet are used as controls, while treated lambs receive the same diet but with 20 ppm of 60 ppm. (parts per million) of test drug added. At the end of the six-week treatment period, the lambs are again weighed, and total feed consumed is calculated.

Six-week weight gains are presented in Table II and kg. feed per kg. gain in Table III. From these data it can be seen that lambs fed at 20 ppm. and 60 ppm. for six weeks improved gain by 15.3% and 11.1%, respectively. Feed utilization was improved by 10.0% and 9.8% for the 20 ppm. and 60 ppm. levels.

LAMB DIET

| | % |
|---|---|
| Ground Corn Cob | 15.0 |
| Ground Yellow Corn | 48.0 |
| Soybean Oil Meal (49%) | 10.0 |
| Dehydrated Alfalfa Meal | 15.0 |
| Molasses | 10.0 |
| Iodized Salt | 0.5 |
| Dicalcium Phosphate | 1.0 |
| Premix | 0.5 |
| | 100.0 |

Premix for One Ton

| | |
|---|---|
| Tra-Min No. 3[1] | 454 grams |
| Vitamin A (30,000 μ/g) | 133 |
| Vitamin D$_3$ (200,000 μ/g) | 5 |
| Corn Oil | 100 |
| Ground Corn | 3848 |
| | 4540 |

(1) Tra-Min No. 3:

| | |
|---|---|
| Calcium | 21.00% |
| Manganese | 12.50% |
| Iron | 6.00% |
| Zinc | 5.00% |
| Copper | 0.65% |
| Iodine | 0.35% |
| Cobalt | 0.25% |

TABLE II

| Treatment | Level (ppm) | Average Six-Week Lamb Gain (kg) Replication 1 | 2 | 3 | 4 | Total | Average | % Improvement |
|---|---|---|---|---|---|---|---|---|
| Control | — | 9.65 | 10.07 | 8.53 | 9.52 | 37.77 | 9.44 | — |
| 2-(2-bromo-4-methylphenylimino)-1,3-dithietane | 20 | 10.40 | 10.93 | 11.33 | 10.87 | 43.53 | 10.88 | 15.3 |
| 2-(2-bromo-4-methylphenylimino)-1,3-dithietane | 60 | 11.40 | 12.02 | 10.17 | 8.37 | 41.96 | 10.49 | 11.1 |

TABLE III

| Treatment | Level (ppm) | Six-Week Feed Efficiency (kg Feed/kg Gain) Replication 1 | 2 | 3 | 4 | Total | Average | % Improvement |
|---|---|---|---|---|---|---|---|---|
| Control | — | 6.98 | 6.28 | 7.03 | 6.24 | 26.53 | 6.63 | — |
| 2-(2-bromo-4-methylphenylimino)-1,3-dithietane | 20 | 6.39 | 5.73 | 5.85 | 5.86 | 23.83 | 5.96 | 10.0 |
| 2-(2-bromo-4-methylphenylimino)-1,3-dithietane | 60 | 5.99 | 5.39 | 6.32 | 6.23 | 23.93 | 5.98 | 9.8 |

EXAMPLE 3

Growth Enhancement and Feed Efficiency in Cattle

To determine the effect of feeding a 2-arylimino-1,3-dithietane compound to finishing beef cattle, 100 yearling steers were blocked by weight into four groups of 25 head each. Within each weight group, steers were randomly allotted to five pens, resulting in five steers per pen. One pen from each weight group was randomly assigned to each of five treatments, as outlined in Table IV. Steers on Treatment A received the basal diet, shown in Table V. The cattle on Treatments B, C, D and E received the same ration supplemented with 2-(2-bromo-4-methylphenylimino)-1,3-dithietane at the levels shown in Table IV. The drug was incorporated into a ground milo premix, and the premix added in appropriate quantities to the daily feed. Feed and water were supplied ad libitum and feed consumption measured. All steers were weighed individually at the beginning and end of the 112-day experiment. Water was withheld for 16 hours immediately prior to weighing.

The average daily gain and feed required per unit of gain for each treatment are shown in Table VI. From these data it can be seen that cattle fed between 50 mg. and 400 mg. of this drug per head per day gain more rapidly and require less feed per unit of gain than cattle fed only the control diet.

TABLE IV

| Treatment Designation | Treatment Groups Level of Compound (mg/head/day) | Number of Pens* | Number of Cattle |
|---|---|---|---|
| A | 0 (Control) | 4 | 20 |
| B | 50 | 4 | 20 |
| C | 100 | 4 | 20 |
| D | 200 | 4 | 20 |
| E | 400 | 4 | 20 |
|   |   | Total | 100 |

*One pen from each of four weight-outcome groups.

TABLE V

| Basal Ration Ingredient | % |
|---|---|
| Alfalfa Hay | 14.0 |
| Milo-steam flaked | 78.0 |
| Molasses | 3.0 |
| Fat | 3.0 |
| Supplement* | 2.0 |
| *Supplement | % |
| Urea (45% N) | 29.0 |
| Defluorinated Rock Phosphate | 16.7 |
| Limestone | 48.9 |
| Trace minerals | 5.0 |
| Vitamin A (16 mil. I.U./lb) | 0.4 |

TABLE VI

| Treatment Designation | Performance Drug Intake (mg./head/day) | Average Daily Gain (lbs.) | Feed per Unit Gain |
|---|---|---|---|
| A | 0 | 2.50 | 7.63 |
| B | 50 | 2.70 | 7.10 |
| C | 100 | 2.62 | 7.36 |
| D | 200 | 2.52 | 7.41 |
| E | 400 | 2.55 | 7.53 |

EXAMPLE 4

Growth Enhancement and Feed Efficiency Evaluation in the Chick

To determine the effect of feeding a 2-arylimino-1,3-dithietane compound on the growth and feed efficiency of the chicken, five male and five female day-old Hubbard x Arbor Acre chicks were randomly allotted to battery pens. Four such pens were fed the basal diet (Table VII), and 2-(2-bromo-4-methylphenylimino)-1,3-dithietane was added to the diet of two additional such pens at a level of 10 ppm. Each pen of chicks was weighed initially, and after 28 days on experiment, feed consumption was determined for each pen. Feed and water were supplied ad libitum. Average 28-day chick weights for control and treated birds were 623 and 646 grams, respectively. Average feed per gain ratios for control and treated birds were 1.58 and 1.57, respectively. From these data, it can be seen that chicks fed 10 ppm of this drug gained more rapidly and required less feed per unit gain than chicks fed only the control diet.

TABLE VII

| Chick Basal Diet Ingredient | % | |
|---|---|---|
| Ground yellow corn | 53.45 | |
| Soybean oil meal (49%) | 28.0 | |
| Menhaden fish meal (60%) | 5.0 | |
| Corn gluten meal (60%) | 5.0 | |
| Dehydrated alfalfa meal (17%) | 2.0 | |
| Stabilized fat | 4.0 | |
| Dicalcium phosphate | 1.2 | |
| Ground limestone | 0.5 | |
| Sodium chloride | 0.3 | |
| *Vitamin premix | 0.5 | |
| **Tra-Min No. 3 | 0.05 | |
| Total | 100.00 | |
| *Vitamin Premix for 1 Ton | | |
| DL methionine | 453.6 | grams |
| BHT | 113.6 | |
| Vitamin A (30,000 μ/g) | 100.0 | |
| Vitamin D$_3$ (200,000 μ/g) | 5.0 | |
| Vitamin E (20,000 μ/lb) | 45.4 | |
| Riboflavin | 4.0 | |
| Niacinamide | 25.0 | |
| Ca. Pantothenate | 8.0 | |
| Vitamin K (menadione) | 1.0 | |
| Parvo (10%), folic acid | 13.0 | |
| Choline chloride (50%) | 908.0 | |
| Proferm (20 mg/lb), B$_{12}$ | 227.0 | |
| Corn oil | 50.0 | |
| Fine ground corn | 2582.4 | |
|  | 4536.0 | |
| **Tra-Min No. 3 | | 1 lb/Ton Furnishes |
| Manganese | 12.50% | 62.5 ppm |
| Iron | 6.00 | 30.0 |
| Zinc | 5.00 | 25.0 |
| Copper | 0.65 | 3.25 |
| Iodine | 0.35 | 1.75 |
| Cobalt | 0.25 | 1.25 |
| Calcium min. | 15.30 | |
| max. | 18.35 | |

EXAMPLE 5

Growth Enhancement and Feed Efficiency Evaluation in Swine

To determine the effect of feeding a 2-arylimino-1,3-dithietane compound to swine, 42 weanling pigs (approximately 30 kg. body weight) were randomly allotted to individual pens. Basal diet (Table VIII) was fed to 21 pigs, and 2-(2-bromo-4-methylphenylimino)-1,3-dithietane was added to the diet of the remaining pigs at a level of 30 ppm. All pigs were weighed individually at the beginning and the end of the experiment (12 weeks duration). Feed and water were supplied ad libitum, and feed consumption was measured.

After 12 weeks on test, the control and treated pigs gained an average of 64.8 and 65.4 kg., respectively. Average feed per gain ratios for control and treated pigs for this same period were 2.91 and 2.85, respectively. From these data, it can be seen that swine fed 30 ppm of this drug gained more rapidly and required less feed per unit gain than swine fed only the control diet.

TABLE VIII

| Ingredient | Swine Basal Diet | % |
|---|---|---|
| Ground yellow corn | | 75.65 |
| Soybean oil meal (44%) | | 17.50 |
| Meat and bone scraps | | 2.50 |
| Dried whey | | 2.50 |
| Dicalcium phosphate | | 1.00 |
| Ground limestone | | 0.20 |
| Iodized salt | | 0.50 |
| *Cyanamid premix (vitamin) | | 0.075 |
| **Cyanamid premix (mineral) | | 0.075 |
| | Total | 100.000 |

| *Vitamin Premix for Diet No. 580 | | |
|---|---|---|
| Vitamin A | | 2,000,000 I.U. |
| Vitamin $D_3$ | | 400,000 I.U. |
| Riboflavin | | 4 grams |
| Pantothenic acid | | 10 grams |
| Niacinamide | | 20 grams |
| Menadione (Vitamin K) | | 2 grams |
| Vitamin $B_{12}$ | | 10 milligrams |
| Carrier to total of 1 pound | | |

| **Trace Mineral Premix for Diet No. 580 | | 1 lb/Ton Furnishes |
|---|---|---|
| Iron | 10% | 50 ppm |
| Copper | 1% | 5 ppm |
| Manganese | 6% | 30 ppm |
| Zinc | 10% | 50 ppm |

EXAMPLE 6

Preparation of 2-(o-Tolylimino)-1,3-dithietane

To an ice-cooled mixture of 3330 ml. of ammonium hydroxide (28%) and 6640 ml. of water in a suitable reaction vessel is added a mixture of 3570 grams of o-toluidine and 2350 grams of carbon disulfide in 3330 ml. of i-propyl alcohol over about a 1.5-hour period. By cooling, the mixture is maintained below about 10°C. After an additional 1.0 hour to 1.5 hours, the solids are collected by filtration, washed with methyl ethyl ketone, and air-dried overnight. The ammonium o-tolyldithiocarbamate is recovered.

In a suitable reaction vessel is mixed 6090 grams of methylene bromide, 1955 grams of sodium bicarbonate and 13.2 liters of dimethylformamide (DMF). The mixture is cooled to 12°C. and maintained between 12°C. and 20°C. while adding powdered ammonium o-tolyldithiocarbamate in small portions over about a 2-hour period. After stirring for an additional 4 hours at room temperature, the mixture is poured into a separatory funnel and diluted with an equal volume of water. The lower oily phase is separated and the upper aqueous DMF phase is extracted three times with 3.5-liter portions of ethylene chloride. The combined organic phase is washed with water and filtered. In a suitable vessel, the washed ethylene chloride mixture is diluted with an additional 36 liters of ethylene chloride, cooled to 10°C. to 15°C., and well stirred while adding 3690 ml. of 37% hydrochloric acid. After the mixture comes to room temperature, the solids are collected by filtration and washed with ethylene chloride and then methyl ethyl ketone. The air-dried hydrochloride salt of 2-o-tolylimino-1,3-dithietane is finely pulverized and mixed with 14.5 liters of water. The mixture is cooled and about 2800 ml. of ammonium hydroxide is added over about 30 minutes to give a final acidity of pH 8. The solids are collected by filtration, washed with water, and air-dried to give 2-o-tolylimino-1,3-dithietane, melting point 34°C. to 35°C.

EXAMPLE 7

Preparation of 2-(4-Chloro-2-methylphenyl)imino-1,3-dithietane

To a well-stirred mixture of 2615 grams of 4-chloro-2-methylaniline in 9200 ml. of dimethylformamide in a water-cooled flask is added 739 grams of porous sodium hydroxide beads followed by 1406 grams of carbon disulfide. When the sodium hydroxide has largely gone into solution (1 to 2 hours with temperature kept below 50°C. by cooling), the resulting mixture is added slowly to 6440 grams of methylene bromide and 1553 grams of sodium bicarbonate well stirred in 9300 ml. of dimethylformamide. The addition time is about one hour with the reacting temperature kept below about 50°C. by external cooling. After an additional 2 hours at room temperature, the reaction mixture is poured into an equal volume of water and the organic material is partitioned into ethylene chloride. The ethylene chloride mixture is washed with water and with 5% hydrochloric acid and filtered free of some insoluble material. The ethylene chloride mixture is cooled to 10°C. to 15°C. and 2310 ml. of 37% hydrochloric acid is added slowly with stirring. The resulting solids are collected by filtration, washed with ethylene chloride and methyl ethyl ketone, and air-dried to give 1709 grams of hydrochloride salt. The pulverized salt is stirred in water and 428 grams of 28% aqueous ammonia is added. The resulting oil, after recovery by extraction with ethylene chloride and solvent removal under reduced pressure, amounts to 1333 grams. It crystallizes and melts at 43°C. to 46°C. The infrared spectrum shows strong C=N absorption at 1630 $cm^{-1}$ in the infrared.

EXAMPLE 8

Preparation of 2-(m-Nitrophenylimino)-1,3-dithietane

A mixture of 75.0 grams of potassium t-butylate in 500 ml. of t-butyl alcohol is saturated with hydrogen sulfide. With the temperature kept below 35°C. by cooling, a mixture of 120.0 grams of m-nitrophenyl isothiocyanate in 500 ml. of ether is added to the potassium hydrosulfide solution in three portions. After the mixture is stirred an additional 2 hours, the solids are collected by filtration, washed with ether, and dried under reduced pressure to give 162 grams of potassium m-nitrophenyldithiocarbamate. This salt is added portionwise over about 15 minutes to a stirred ice-cooled mixture of 174 grams of methylene bromide and 65 grams of triethylamine in 600 ml. of dimethylformamide with the reaction temperature at 25°C. to 30°C. After another 5 hours of stirring at room temperature, the mixture is poured into 3.5 liters of ice water precipitating a light yellow solid. The solids, after drying, are taken up in benzene (ca. 2 liters), filtered free of some insoluble material, and the benzene mixture is saturated with dry hydrogen chloride. The precipitated solids are collected by filtration, washed with benzene, and then stirred vigorously with a water-benzene mixture at 60°C. to 70°C. The benzene layer is separated, washed with water and sodium bicarbonate solution, dried, and concentrated under reduced pressure to give 102 grams of crude product. The solids are dissolved in 800 ml. of ethanol, the mixture is filtered and diluted with 1200 ml. of ether, and the mixture cooled to −35°C. The resulting light yellow solids are collected and dried under reduced pressure to give 84.0 grams of product, melting point 96.0°C. to 97.0°C.

EXAMPLE 9

Following the procedure of Example 7 above, and substituting the appropriate aniline for 4-chloro-2-methylaniline in said procedure, yields the compounds set forth in Table IX below.

TABLE IX

2-Arylimino-1,3-dithietanes

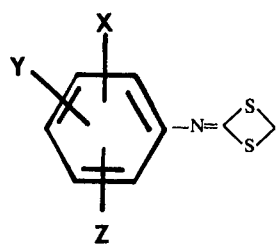

| X | Y | Z | Melting Point °C |
|---|---|---|---|
| 4—N=C=S | H | H | 121–122 |
| 4—Cl—C$_6$H$_4$—O— | H | H | 58.5–59 |
| 4—(S-CH$_2$-S)=N— | H | H | 220–223 |
| 3—CH$_3$ | H | H | 28.5–29.5 |
| 3—C$_2$H$_5$O— | H | H | oil |
| 2—Cl | 3—Cl | H | 77–79 |
| 2—CH$_3$ | 3—Cl | H | 80–81.5 |
| 2—CH$_3$ | 4—Br | H | oil |
| 2—Br | 4—CH$_3$ | H | 63–65 |
| 2—Cl | 5—Cl | H | 98–99 |
| 2—C$_2$H$_5$ | 6—C$_2$H$_5$ | H | 56–57 |
| 2—CH$_3$O— | H | H | 112–114 |
| 2—CH$_3$ | 4—CH$_3$ | 5—CH$_3$ | 41–42 |
| 2—Cl | 4—CH$_3$ | H | 67.5–70.5 |
| 3—CH$_3$O— | 4—CH$_3$O— | H | 82.5–83.5 |
| 4—OH | 3—Cl | 5—Cl | 171.5–173.5 |
| 4—SO$_2$—N(pyrrolidinyl) | H | H | 117.5–118.5 |
| 4—S—C$_6$H$_4$—NO$_2$ | H | H | 109.5–110.5 |
| 4—NO$_2$ | 2—OCH$_3$ | H | 139–141 |
| 3—N=(S-CH$_2$-S) | H | H | 152–154 |
| 2—SCH$_3$ | H | H | 121.5–123 |
| 2—Br | H | H | 68–70 |
| 2—OC$_2$H$_5$ | H | H | 75.5–78.0 |
| 2—CH$_3$ | 6—CH$_3$ | H | 111–113.5 |
| 2—SOCH$_3$ | H | H | 75–80 |
| 2—F | H | H | 52.5–53.5 |
| —O—CH$_2$—O— | | H | 83–85 |
| 2—Br | 4—CO$_2$CH$_3$ | H | 81–84 |

We claim:

1. A method for improving feed efficiency and enhancing the growth rate of poultry and animals selected from the group consisting of chickens, turkeys, mink, rabbit, sable, sheep, cattle, swine and goats, comprising orally or parenterally administering to said poultry and animals a growth promoting amount of a compound having the formula:

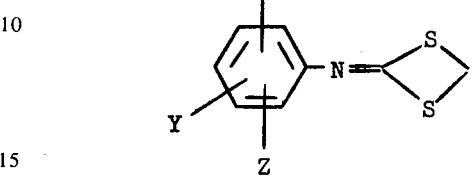

wherein X is a member selected from the group consisting of halogen, C$_1$–C$_4$ alkyl, C$_1$–C$_4$ alkoxy, thiocyano, nitro, pyrrolidinylsulfonyl, dithietane, C$_1$–C$_4$ alkylthio and C$_1$–C$_4$ alkylsulfonyl; Y is a member selected from the group consisting of hydrogen, halogen, C$_1$–C$_4$ alkyl, C$_1$–C$_4$ alkoxy and —CO$_2$R wherein R is C$_1$–C$_4$ alkyl and Z is a member selected from the group consisting of hydrogen, chloro and C$_1$–C$_4$ alkyl.

2. The method in accordance with claim 1 for enhancing the growth rate of animals selected from the group consisting of sheep, cattle, swine and goats.

3. The method in accordance with claim 1 for enhancing the growth rate of animals selected from the group consisting of mink, rabbit and sable.

4. The method in accordance with claim 1, for enhancing the growth rate of chickens and turkeys.

5. The method in accordance with claim 1, for enhancing the growth rate of cattle.

6. The method according to claim 1, wherein said compound is orally administered to said poultry and animals in an amount equivalent to between 0.0001% and 0.05% by weight of the animal feed.

7. The method according to claim 1, wherein said compound is parenterally administered as a subcutaneous implant beneath the skin of said animal and said implant being sufficient to provide from 0.001 mg to 0.2 mg. of said compound per kg. of animal body weight per day.

8. The method according to claim 1, wherein the compound is 2-(2-bromo-4-methylphenylimino)-1,3-dithietane.

9. The method according to claim 1, wherein the compound is 2-(2-bromo-4-carbomethoxyphenylimino)-1,3-dithietane.

10. The method according to claim 1, wherein the compound is 2-(2,4-dimethylphenylimino)-1,3-dithietane.

11. The method according to claim 1, wherein the compound is 2-(2-methyl-4-chlorophenylimino)-1,3-dithietane.

* * * * *